(12) United States Patent
Cook et al.

(10) Patent No.: US 8,294,300 B2
(45) Date of Patent: Oct. 23, 2012

(54) WIRELESS POWERING AND CHARGING STATION

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 12/353,851

(22) Filed: Jan. 14, 2009

(65) Prior Publication Data
US 2009/0179502 A1     Jul. 16, 2009

Related U.S. Application Data

(60) Provisional application No. 61/021,001, filed on Jan. 14, 2008.

(51) Int. Cl.
*H01F 27/28* (2006.01)
*H01F 38/14* (2006.01)
(52) U.S. Cl. .................. 307/104; 320/108; 320/109
(58) Field of Classification Search .................. 307/104; 320/108–109
See application file for complete search history.

(56) References Cited

U.S. PATENT DOCUMENTS

| | | | | |
|---|---|---|---|---|
| 5,959,433 A * | 9/1999 | Rohde | ........................... | 320/108 |
| 6,134,421 A * | 10/2000 | Lee et al. | ................... | 455/575.9 |
| 6,172,608 B1 * | 1/2001 | Cole | ........................... | 340/572.1 |
| 6,590,394 B2 * | 7/2003 | Wong et al. | ................... | 324/318 |
| 6,856,819 B2 * | 2/2005 | Itoh | ........................... | 455/575.7 |
| 6,912,137 B2 * | 6/2005 | Berghegger | ................ | 363/21.03 |
| 7,046,146 B2 * | 5/2006 | Wuidart et al. | ........... | 340/572.1 |
| 7,180,503 B2 * | 2/2007 | Burr et al. | ....................... | 345/163 |
| 7,495,414 B2 * | 2/2009 | Hui | ............... | 320/108 |
| 7,515,049 B2 * | 4/2009 | Sharma et al. | .............. | 340/572.6 |
| 7,525,283 B2 * | 4/2009 | Cheng et al. | ................... | 320/108 |
| 7,576,514 B2 * | 8/2009 | Hui | ............... | 320/108 |
| 7,633,263 B2 * | 12/2009 | Toya | ............... | 320/108 |
| 7,741,734 B2 | 6/2010 | Joannopoulos et al. | | |
| 7,825,543 B2 | 11/2010 | Karalis et al. | | |
| 2004/0130425 A1 * | 7/2004 | Dayan et al. | ................... | 336/200 |
| 2005/0104453 A1 * | 5/2005 | Vanderelli et al. | ............ | 307/151 |
| 2005/0127867 A1 | 6/2005 | Calhoon et al. | ............... | 320/108 |
| 2005/0131495 A1 | 6/2005 | Parramon et al. | ................. | 607/61 |
| 2007/0222542 A1 | 9/2007 | Joannopolous | | |
| 2008/0067874 A1 * | 3/2008 | Tseng | ........................... | 307/104 |
| 2008/0191897 A1 | 8/2008 | McCollough | ............. | 340/625.22 |
| 2009/0015075 A1 * | 1/2009 | Cook et al. | ..................... | 307/149 |
| 2009/0058189 A1 * | 3/2009 | Cook et al. | ..................... | 307/104 |
| 2009/0134712 A1 * | 5/2009 | Cook et al. | ..................... | 307/104 |

(Continued)

FOREIGN PATENT DOCUMENTS

WO    WO 2010014634 A2 *    2/2010

OTHER PUBLICATIONS

"Wireless Non-Radiative Energy Transfer", MIT paper, publication and date unknown, believed to be 2007.

(Continued)

*Primary Examiner* — Adi Amrany
(74) *Attorney, Agent, or Firm* — Knobbe Martens Olson & Bear, LLP

(57) ABSTRACT

A base including a magnetically resonant antenna therein for relaying energy to a portable device.

25 Claims, 3 Drawing Sheets

U.S. PATENT DOCUMENTS

| | | | |
|---|---|---|---|
| 2009/0160261 A1* | 6/2009 | Elo | 307/104 |
| 2009/0212636 A1* | 8/2009 | Cook et al. | 307/104 |
| 2009/0243397 A1* | 10/2009 | Cook et al. | 307/104 |
| 2010/0038970 A1* | 2/2010 | Cook et al. | 307/104 |
| 2010/0127660 A1* | 5/2010 | Cook et al. | 320/108 |
| 2010/0277005 A1 | 11/2010 | Karalis et al. | |
| 2010/0277120 A1* | 11/2010 | Cook et al. | 320/108 |
| 2010/0289449 A1* | 11/2010 | Elo | 320/108 |
| 2011/0121660 A1* | 5/2011 | Azancot et al. | 307/104 |
| 2011/0304216 A1* | 12/2011 | Baarman | 307/104 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

* cited by examiner

WIRELESS POWERING AND CHARGING STATION

This application claims priority from provisional application No. 61/021,001, filed Jan. 14, 2008, the entire contents of which disclosure is herewith incorporated by reference.

BACKGROUND

Previous applications by Nigel Power LLC have described a wireless powering and/or charging system using a transmitter that sends a magnetic signal with a substantially unmodulated carrier. A receiver extracts energy from the radiated field of the transmitter. The energy that is extracted can be rectified and used to power a load or charge a battery.

It is desirable to transfer electrical energy from a source to a destination without the use of wires to guide the electromagnetic fields. Previous attempts has often received low efficiency together with an inadequate amount of delivered power.

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power.

The system can use transmit and receiving antennas that are preferably resonant antennas, which are substantially resonant, e.g., within 10% of resonance, 15% of resonance, or 20% of resonance. The antenna(s) are preferably of a small size to allow it to fit into a mobile, handheld device where the available space for the antenna may be limited. An efficient power transfer may be carried out between two antennas by storing energy in the near field of the transmitting antenna, rather than sending the energy into free space in the form of a travelling electromagnetic wave. Antennas with high quality factors can be used. Two high-Q antennas are placed such that they react similarly to a loosely coupled transformer, with one antenna inducing power into the other. The antennas preferably have Qs that are greater than 200, although the receive antenna may have a lower Q caused by integration and damping.

SUMMARY

The present application describes a wireless desktop for wireless power transfer.

An embodiment discloses a base that receives wireless power, and repeats it for use with a portable electronic device.

DETAILED DESCRIPTION

Several embodiments of wireless powering and charging station for low power portable electronic devices are disclosed herein.

Figure 1:
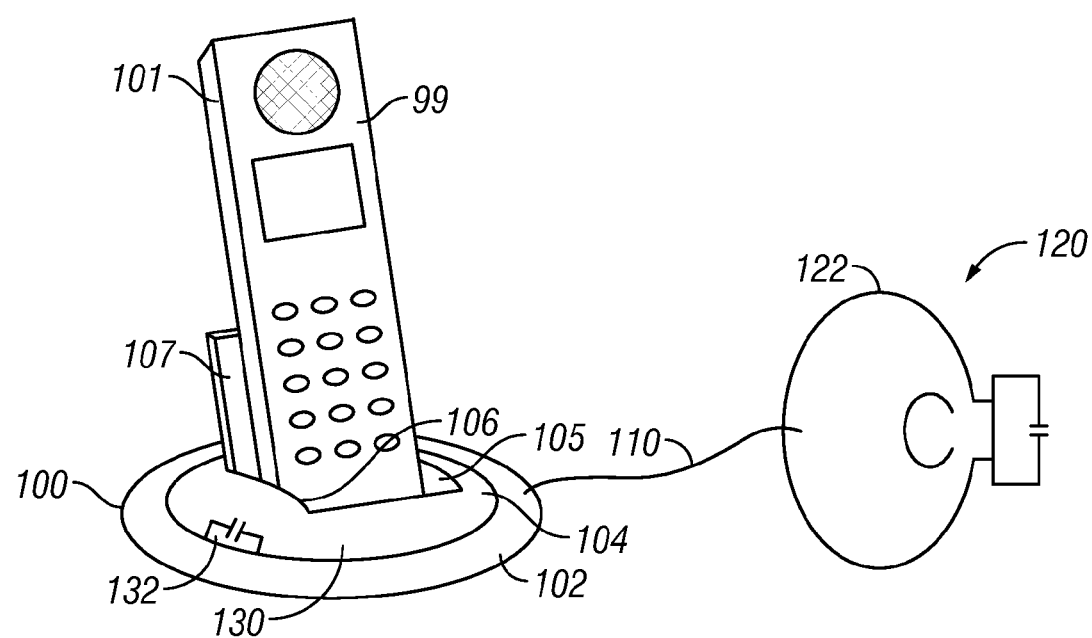
FIG. 1 shows a block diagram of a device transmitting to a remote receiver.

A first embodiment discloses a wireless power station for a portable electronic device, e.g. a cordless phone, with reference to FIG. 1. According to the embodiments, the term "wireless power station" is used to refer to a device that wirelessly transmits power that can either provide power to a device, or can charge a rechargeable battery within that device. According to the embodiment, the device 100 can include a base 102 which has an antenna 104 incorporated therein. The antenna 104 can receive power via magnetically coupled resonance, shown generically as 110, from a transmitter of magnetic power 120 that is remote from the antenna 104.

The transmitter 120 can produce magnetic fields as disclosed in our co-pending applications, and may include loosely coupled resonant loop/coil antennas that are preferably of high-quality factor e.g. quality factor Q larger than 500. These devices may operate in either a low-frequency range or a high frequency range.

Figure 2:
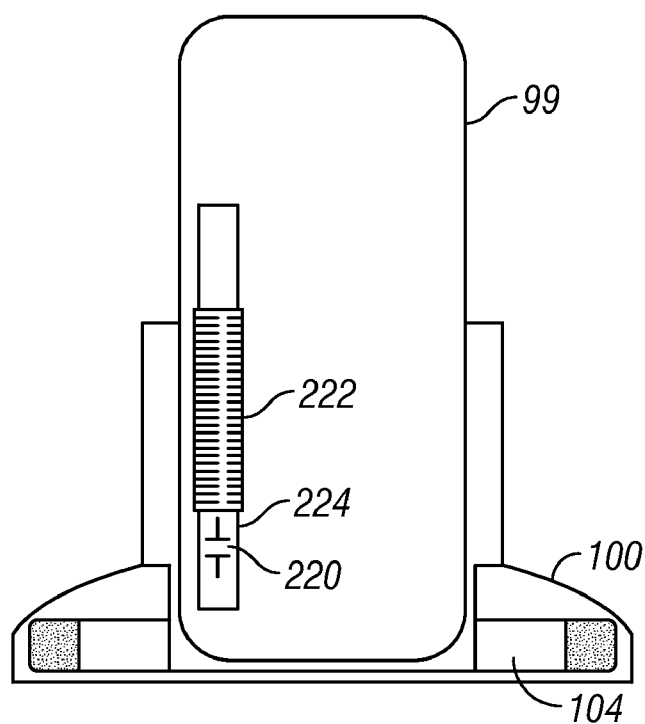
FIG. 2 shows a cross section of the FIG. 1 embodiment.

FIG. 2 illustrates a cross-section of the embodiment shown in FIG. 1. The phone 99 is mounted on the base 100. 104 shows a cross-section of the loop/coil antenna that is integrated into the wireless charging station. This antenna receives wirelessly power from the remote transmitter 120. In the embodiment of FIG. 2, the integrated coil in the charging base acts as a parasitic antenna that relays and in essence focuses the magnetically-generated power to a coil form antenna 220 integrated into the phone 99. One advantage of this embodiment is that the phone 99 can then operate as a wireless receiver of power with or without the charging base. The charging base becomes a system that allows operation more effectively via repeating of the magnetic energy.

The antenna 220 may be an integrated ferrite Rod antenna formed of a spool wound coil 222 and a capacitive device 224 in series with the spool wound coil. The inductance and capacitance together form a circuit that has an LC constant which is substantially resonant with the frequency used by the transmitter 120, and as repeated by the antenna 104.

An advantage of FIG. 2 embodiment is that the form factor of the structures fit well within the space provided. The loop coil antenna 104 is round in cross-section, and fits into the round cross section base 100. The coil antenna 220 is straight and cylindrical, and fits well into the straight body of the phone. Other shaped devices can of course be used.

Figure 3:
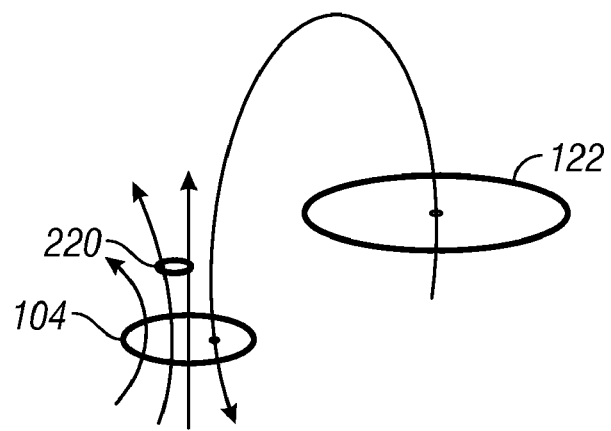
FIG. 3 shows how the base of the FIG. 1 embodiment can repeat the signal.

FIG. 3 illustrates how the primary antenna 122 of the transmitter produces magnetic power that have electrical energy therein. This is transmitted via magnetic field coupling to a secondary antenna 104 that is integrated into the base of the power station 100. This relays the power again via magnetic field coupling to the tertiary antenna 220 which is within the portable device. This forms a locally increased field due to the mutual coupling. In addition, as described above, the portable device may also receive power directly from the base station.

However, the inventors recognized that the antenna 220 integrated in the portable device may be constrained by the size and/or geometry of the portable device. As such, it may be less efficient than the antenna integrated in the charging station. The less efficient antenna may make it more difficult to receive sufficient power directly from the power base station at the desired distance. The effect of the secondary antenna may be considered as that of a parasitic antenna locally magnifying the magnetic field in the vicinity of the charging station, increasing the overall efficiency of the receive antenna in the portable device. Therefore the embodiment of FIG. 2 may increase the distance and/or efficiency and/or power density of a wireless power station.

When the portable device 99 is placed closely enough to the primary antenna, the same portable device 99 may also receive electrical energy directly from the power base station 120.

Thus, the repeating station of the first embodiment may be most useful when used to obtain power at longer distances or otherwise fringe areas.

Moreover, the magnetic coupling between charging station and portable device may have certain advantages compared to the conductive coupling using electrical contacts (the classical solution). For example, contacts in electrical charging may become soiled or oxidized. Also, an electronic charging device typically is only usable with one device, into which the connector mates. A magnetic coupled charging station may be configured to charge e.g. different types of wireless power-enabled cordless phones.

In all of the embodiments, the portable device such as 99 is formed in a case such as 101. The case has outer dimensions. The base 100 has a holding portion 105 for the portable device. The holding portion 105 includes surfaces such as 106 that are sized in a way that hold the case in place. For example, this may only hold the case on the bottom as near the surfaces 106 in FIG. 1. There may also be a rear holding place such as 107 which holds the portable device upright, and prevents it from falling or moving. Many different portable devices can fit within the opening 105. However, by holding the device 99 in a specified location, the efficiency of coupling magnetically between the antenna 104 and an antenna in the portable device may be improved.

In the embodiments, the portable device is described as being portable phone such as a cellular phone. However, in other embodiments, the portable device may be a personal digital assistant such as PDA, a portable computer such as a laptop or other portable computer, a media player, such as an iPod or others, or other portable electronic device that operates from stored power.

In an embodiment, the antenna 104 includes an inductive loop coil 130, in series with a capacitor 132. The coil and capacitor are selected to have high Q values, for example to provide a Q greater than 500 and even more preferably greater than 1000. In addition, the LC value of the coil is tuned to be substantially resonant with the transmission value from the transmitter 120.

One important feature is that was noted by the inventor is that the efficiency of magnetic transmission of this type may be proportional to the size of the antennas. That is, a bigger loop antenna may produce more efficient transfer of energy. Accordingly, in an embodiment, a loop antenna is used which is integrated as close to the outer perimeter of the base 100 as possible.

In an embodiment shown in FIG. 1, the base has a substantially disk shaped an outer perimeter. This allows the use of a round antenna. However, the disc outer perimeter may be any shape, and in fact a rectangular outer shape base may be used with a rectangular shaped antenna.

Figure 4:
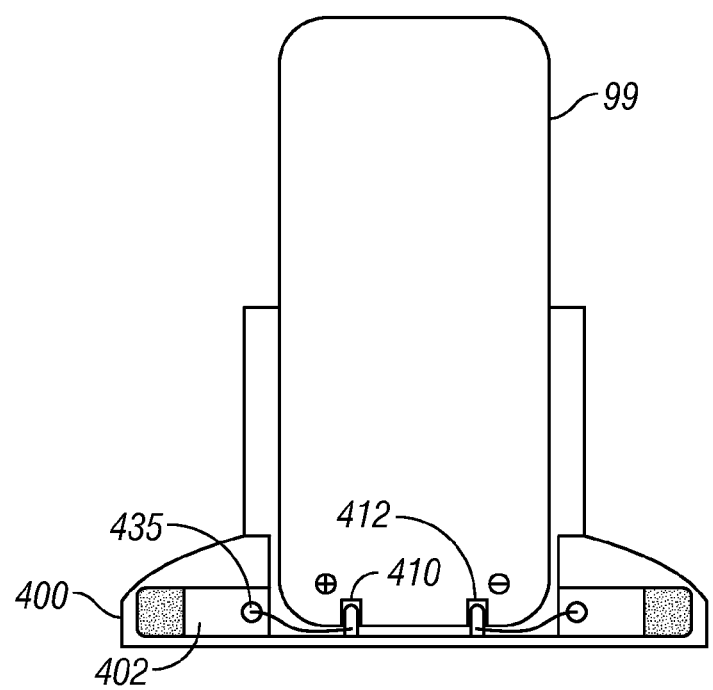
FIG. 4 shows a second embodiment.

Embodiment 2, depicted in FIG. 4, is similar to embodiment 1 with a base 400, antenna 402. Electrical energy received by the wireless charging station is forwarded to the portable device 99 using conductive coupling over contacts 410, 412.

In embodiments where a conductive charging is used, there may be a separate coupling antenna loop 435 which is directly connected to the magnetic contacts. While the coupling loop is connected to the electrical contacts, the Main antenna 400 is electrically unconnected. This maintains the integrity of its impedance and matching.

Figure 5:
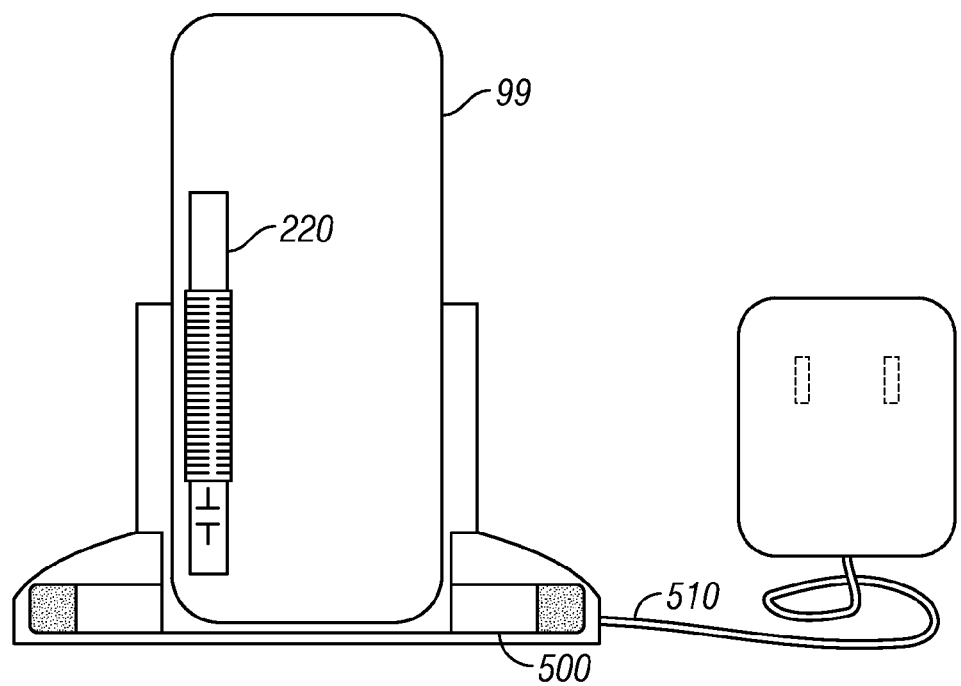
FIG. 5 shows a third embodiment.

Embodiment 3, depicted in FIG. 5, a charging station 500 which receives power through a wired connection 510, e.g. directly from the 110/220 V mains or from a wall plug power supply as in classical solutions. This may use the same kind of portable device 99 as in the first embodiment. The power is magnetically modulated and coupled to the antenna 220 based on magnetic coupled resonance.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. The above has described how the base can be round, but the base can also be rectangular, in which case the antenna can be either round or rectangular. Other shapes of the antennas can also be used.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system comprising:
a holder having a plurality of surfaces that are shaped to contact a plurality of outer surfaces of a portable electronic device and to secure the portable electronic device in a position, the portable electronic device including a wireless power receive element coupled to a load; and
a resonant circuit within the holder, said resonant circuit including a coil in series with a capacitive element, said resonant circuit comprising a parasitic antenna having an inductive-capacitive value that is tuned to a frequency and configured to, when in operation, receive power from a wireless field generated by a transmitter, and that repeats wirelessly received power to the wireless power receive element of the portable electronic device at a power level sufficient to charge or power the load, the resonant circuit having no wired connection to the load.

2. A system as in claim 1, wherein said resonant circuit is integrated in a location that substantially defines a perimeter of the portable electronic device.

3. A system as in claim 2, wherein said perimeter of the holder is substantially disk shaped.

4. A system as in claim 2, wherein inner surfaces of the holder are sized to hold a portable phone.

5. A system as in claim 1, further comprising a transmitter, wherein said transmitter generates an electromagnetic field at a frequency corresponding to the frequency of said resonant circuit.

6. A system as in claim 1, further comprising electrical contacts that connect to the portable electronic device.

7. A system as in claim 6, wherein said resonant circuit further comprises a coupling loop, electrically separate from the coil and capacitive element, and wherein said coil and capacitive element are not electrically connected to said electrical contacts.

8. A system comprising:
a transmitter configured to, when in operation, transmit an electromagnetic field at a first frequency, said transmitter having a transmitter inductive element and a capacitor, the transmitter having an inductive-capacitive value that is tuned to resonate at a resonance frequency corresponding to said first frequency; and
a holder, having a plurality of surfaces that are shaped to contact a plurality of outer surfaces of a portable electronic device and to secure the portable electronic device in a position, the portable electronic device including a wireless power receive element coupled to a load, the holder having a resonant circuit therein, said resonant circuit having a resonant circuit inductive coil in series with a capacitive element, said resonant circuit comprising a parasitic antenna having an inductive-capacitive value that is tuned to resonate at a resonance frequency corresponding to said first frequency and that repeats wirelessly received power to the wireless power receive element of the portable electronic device at a power level sufficient to charge or power the load, the resonant circuit having no wired connection to the load.

9. A system as in claim 8, wherein said resonant circuit is integrated in a location that substantially defines a perimeter of the portable electronic device.

10. A system as in claim 9, wherein said perimeter of the holder is substantially disk shaped.

11. A system as in claim 8, wherein inner surfaces of the holder are sized to contact a plurality of outer surfaces of a portable electronic device and to secure the portable electronic device in a position.

12. A system as in claim 8, further comprising electrical contacts that connect to the portable electronic device.

13. A system as in claim 8, wherein said resonant circuit further comprises a coupling loop, electrically separate from the resonant circuit inductive coil and the capacitive element, and wherein said resonant circuit inductive coil and capacitive element are not electrically connected to said contacts.

14. A system comprising:
a portable electronic device having a housing,
said portable electronic device having a receiver configured to receive wirelessly transmitted power from a resonant circuit comprising a parasitic antenna that is configured to, when in operation, receive power from a wireless field generated by a transmitter and a transmit element and that repeats wirelessly received power, the receiver including a receive circuit having a receiver element and a ferrite rod coupled to a load, the resonant circuit having no wired connection to the load, and
the received wirelessly transmitted power operating at least one circuit within the portable electronic device.

15. A system as in claim 14, wherein said receive circuit is integrated in a location that defines at least a portion of a perimeter of the portable electronic device.

16. A system as in claim 14, further comprising a holder having inner surfaces sized to hold a portable phone.

17. A system as in claim 14, further comprising a transmitter, wherein said transmitter generates an electromagnetic field at a frequency corresponding to a resonant frequency of the resonant circuit.

18. A system as in claim 14, wherein said resonant circuit includes a resonant circuit coil in series with a capacitor.

19. A system comprising:
a portable electronic device having a housing with an outer shape that has a first portion that is elongated along a first axis relative to a second portion,
said portable electronic device having a receiver configured to receive wirelessly transmitted power from a resonant circuit comprising a parasitic antenna that is configured to, when in operation, receive power from a transmitter and a transmit element and that repeats wirelessly received power,
said repeated wirelessly received power operating at least one circuit within the portable electronic device,
and said receiver including a receive circuit having a receiver element coupled to a load that includes a ferrite rod that extends substantially parallel to the first axis, the resonant circuit having no wired connection to the load.

20. A system comprising:
a holder having a plurality of surfaces that are shaped to contact a plurality of outer surfaces of a portable electronic device and to secure the portable electronic device in a position, the holder having a coupling element connected to electrical contacts that are configured to connect to the portable electronic device; and
a resonant circuit within the holder, said resonant circuit having a resonant circuit coil in series with a capacitive portion and having an inductive-capacitive value that is tuned to a frequency, the resonant circuit configured to, when in operation, receive power from a wireless field generated by a transmitter and a transmit element and, the resonant circuit repeating wirelessly received power to the coupling element, the resonant circuit having no wired connection to the coupling element.

21. A system as in claim 20, wherein said resonant circuit further comprises a coupling loop, electrically separate from the resonant circuit coil and capacitive portion, and wherein said resonant circuit coil and capacitive element are not electrically connected to said electrical contacts.

22. A system as in claim 20, wherein said resonant circuit is configured to wirelessly receive power, and wherein said holder is configured to transfer power to the portable electronic device through said electrical contacts.

23. A system as in claim 20, wherein said holder is coupled to a power source through a wired connection, and wherein the resonant circuit is configured to wirelessly transfer power to the portable electronic device.

24. A system comprising:
means for securing a portable electronic device, the means for securing shaped to contact a plurality of outer surfaces of the portable electronic device and to secure the portable electronic device in a position, the portable electronic device including a receive element coupled to a load; and
means for resonating in response to a wireless field, said means for resonating being disposed within the means for securing the portable electronic device, said means for resonating comprising a parasitic antenna having an inductive-capacitive value that is tuned to a frequency and configured to, when in operation, receive power from a transmitter and a transmit coil and that repeats wirelessly received power to the receive element of the portable electronic device at a power level sufficient to charge or power the load, the means for resonating having no wired connection to the load.

25. A method comprising:
operating a resonant circuit as a parasitic antenna having an inductive-capacitive value that is tuned to a frequency, wherein the resonant circuit is within a holder having a plurality of surfaces that are shaped to contact a plurality of outer surfaces of a portable electronic device and to secure the portable electronic device in a position, the portable electronic device including a wireless power receive element coupled to a load;

receiving power from a wireless field generated by a transmitter; and repeating wirelessly received power to the wireless power receive element of the portable electronic device at a power level sufficient to charge or power the load, the resonant circuit having no wired connection to the load.

* * * * *